United States Patent [19]

Burger, Jr.

[11] 4,204,696
[45] May 27, 1980

[54] DOLLIE FOR MANIPULATING A PALLETIZED LOAD AND METHOD OF ITS USE

[75] Inventor: Anthony J. Burger, Jr., Richmond, Va.

[73] Assignee: Johns-Manville Corporation, Denver, Colo.

[21] Appl. No.: 897,992

[22] Filed: Apr. 20, 1978

[51] Int. Cl.² .............................................. B62B 11/00
[52] U.S. Cl. .............................................. 280/79.1 R
[58] Field of Search ...................... 280/79.1 R, 79.1 A, 280/47.21, 47.24, 47.26, 47.27, 47.28, 47.29, 47.33, 85, 47.18, 47.19, 47.2

[56] References Cited

U.S. PATENT DOCUMENTS

| | | | |
|---|---|---|---|
| 267,669 | 11/1882 | Brown | 280/47.21 X |
| 637,284 | 11/1899 | Richman | 280/47.27 X |
| 2,670,093 | 2/1954 | Reppert | 280/47.27 X |
| 2,700,573 | 1/1955 | Nordgand | 280/47.27 X |
| 2,710,759 | 6/1955 | Bayer et al. | 280/47.27 X |
| 3,411,801 | 11/1968 | Ansdell | 280/47.24 |
| 3,512,663 | 5/1970 | Guerrico | 280/47.29 X |
| 3,559,953 | 2/1971 | Litchard | 280/47.24 X |
| 3,761,107 | 9/1973 | Docherty et al. | 280/47.24 X |
| 3,785,669 | 1/1974 | Doheny | 280/47.27 X |
| 3,873,118 | 3/1975 | Takagi | 280/47.24 X |
| 4,136,889 | 1/1979 | Middleton | 280/47.24 X |

FOREIGN PATENT DOCUMENTS 191534 10/1907 Fed. Rep. of Germany ........ 280/47.29
259274 10/1926 United Kingdom ................ 280/47.29

Primary Examiner—Robert R. Song
Assistant Examiner—Norman L. Stack
Attorney, Agent, or Firm—Robert M. Krone; Joseph J. Kelly; William C. Anderson

[57] ABSTRACT

Method and apparatus for manually raising a palletized load off a generally flat surface and carrying the load such that it may be manually wheeled along said surface.

10 Claims, 4 Drawing Figures

U.S. Patent   May 27, 1980   Sheet 1 of 2   4,204,696
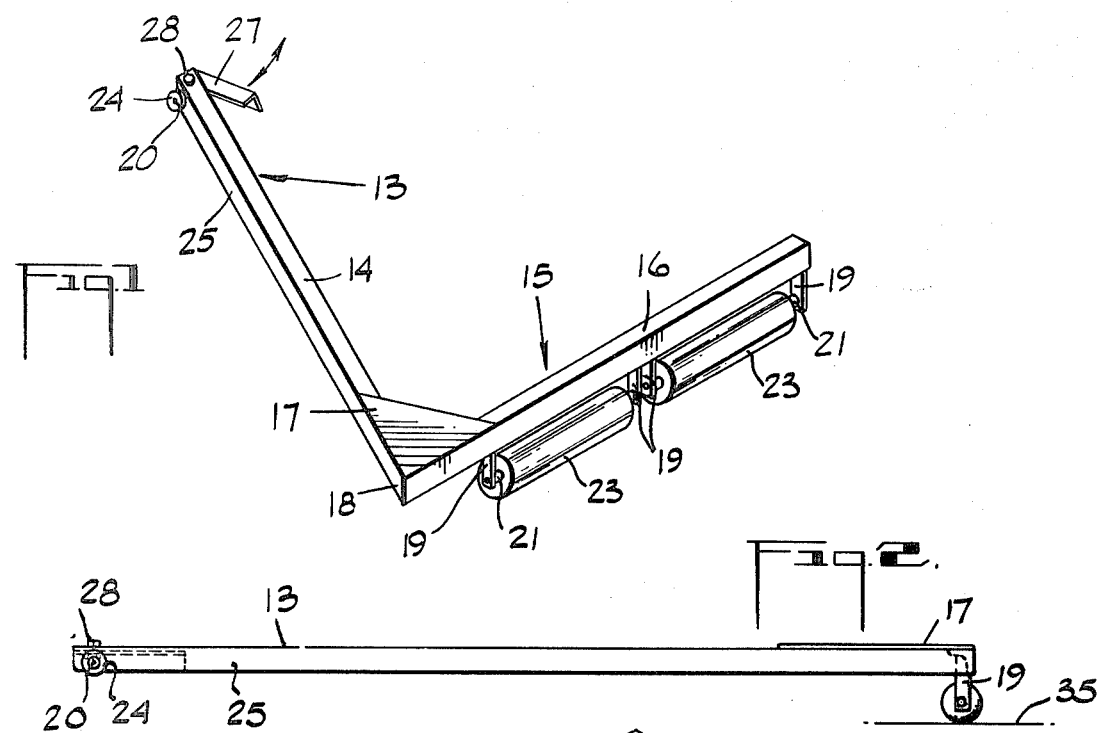
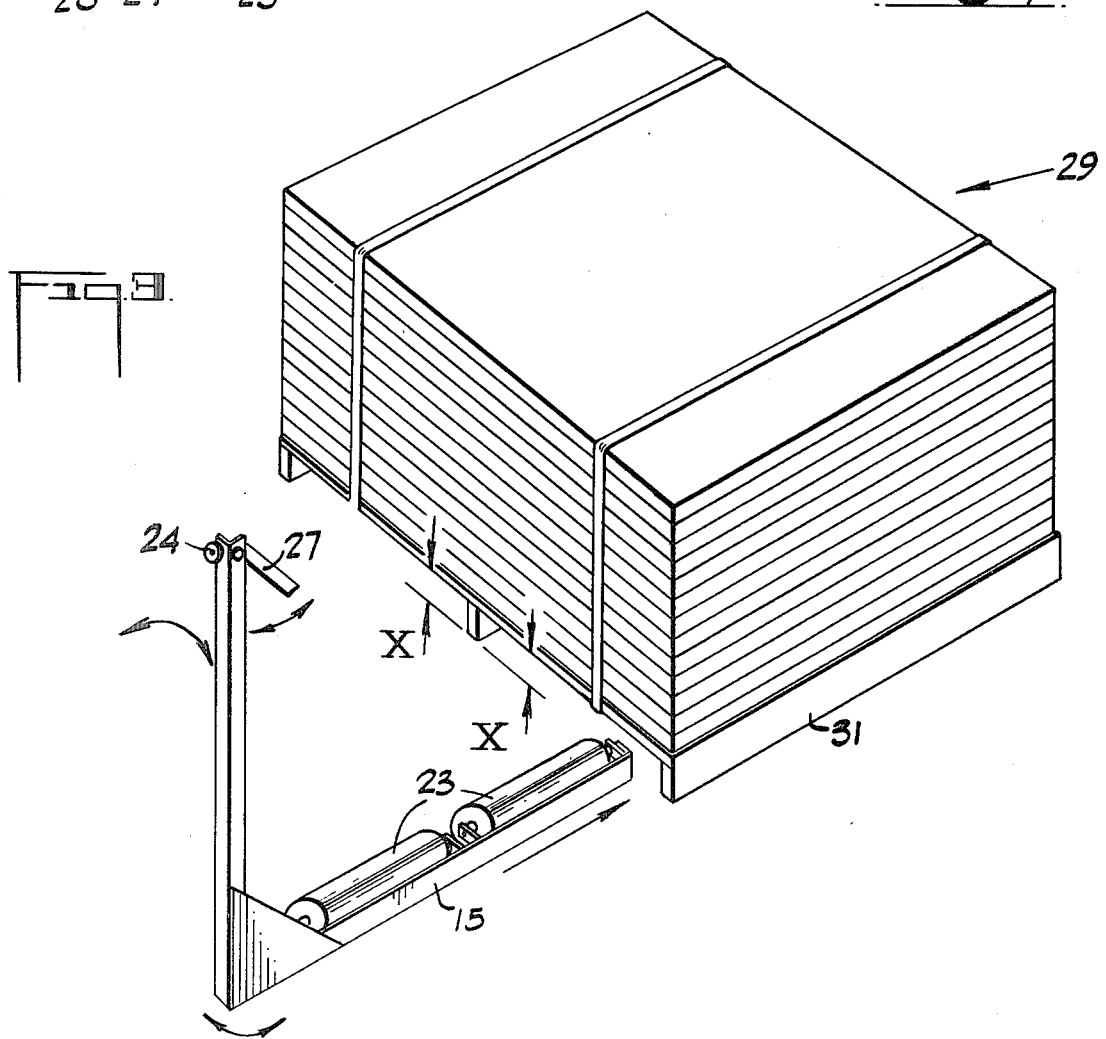

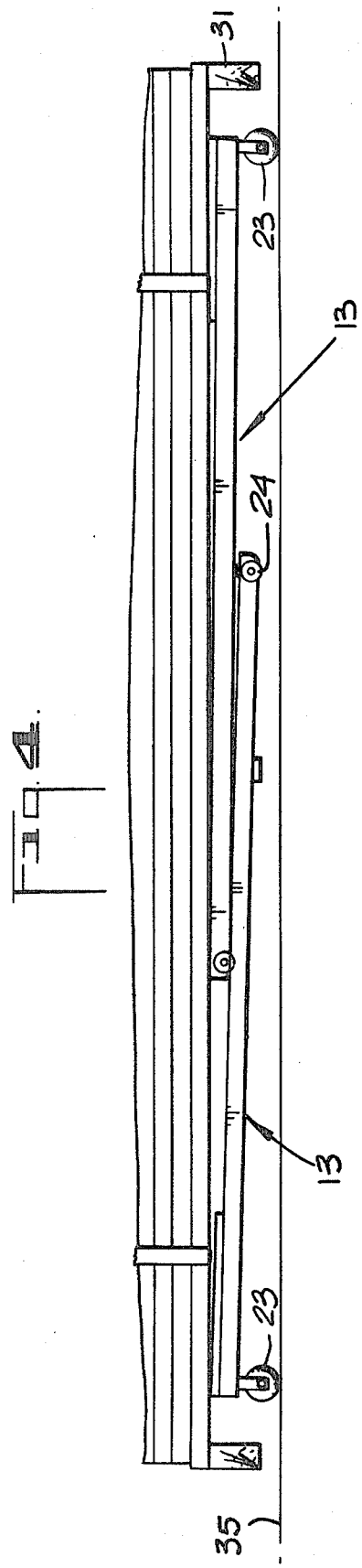

DOLLIE FOR MANIPULATING A PALLETIZED LOAD AND METHOD OF ITS USE

BACKGROUND OF THE INVENTION

This invention relates generally to a dollie for maneuvering palletized material and is particularly useful for maneuvering large palletized loads within a rail car from a position where the load is deposited just inside the doorway to other portions of the rail car on either side of the doorway.

Previously, it has been the experience that palletized material, particularly those palletized loads of a large size, could not be maneuvered by forklift into any portion of the rail car except into the space opposite the doorway. An example of this problem is that which was experienced in the shipping by rail of palletized material measuring 48"×120"×50". Pallet loads of this size, could be fork lifted through the 10' 6" wide doorway of a 50 foot or 60 foot rail car to be stored in and unloaded from only that portion of the rail car directly opposite the doorway.

Accordingly, it is an object of the invention to provide a method and apparatus for manually maneuvering with reasonable ease, a palletized load of material in directions to the left and to the right of the direction of fork entry of the pallet.

It is another object of the invention to provide for the lateral maneuvering of a palletized load of material where there is limited space to the front and rear of the pallet load.

SUMMARY OF THE INVENTION

Accordingly, the instant invention provides a manually operated apparatus for engaging the undersurface of a palletized load and for raising the load off a generally flat surface and carrying the load such that the load is hand-moved and wheeled with relative ease over said surface. The apparatus includes an elongated handle having one end attached to the end of an arm which extends at right angles to the handle and which is insertable in the space between an undersurface of the palletized load and the generally flat surface. The arm has roller means mounted thereon such that said palletized load is raised and carried on said arm and roller means when the handle is moved from a vertical position to a generally horizontal position and said handle has means thereon for engaging the undersurface of said palletized load for retaining the horizontal position of the handle. The invention also includes a method of manually raising a palletized load off a generally flat surface and onto rollers for wheeling said palletized load over said surface and includes the steps of inserting a dollie apparatus under one end portion of the palletized load and levering said end portion off of said surface and into rolling relationship with said surface, and insertion of a second dollie apparatus under the other end portion of the palletized load and levering said end portion in a similar manner as the first end portion and retaining said rolling configuration of said load by engagement of the undersurface of the palletized load by means integral with said dollie apparatus. In a preferred embodiment according to the invention, the apparatus includes an elongated handle made from an angle iron secured at one end to an end of an arm of angle iron to which it is generally perpendicular, the arm having roller braces which extend in a direction perpendicular to said handle and said arm and between which rollers are rotatably mounted on axes parallel to said arm, such that when said handle is vertical, the vertical displacement of said rollers, roller braces and arm is less than the height of the bottom of said palletized load above the generally flat surface, and such that when the arm of the so located apparatus is rotated to a horizontal position the arm engages the undersurface of the pallet and the rollers engage said generally flat surface to carry said load in rolling relationship with said surface, and means attached to the other end of said handle engageable with the undersurface of the load for retaining said handle in its horizontal position.

BRIEF DESCRIPTION OF THE DRAWINGS

FIG. 1 is a view in perspective showing a dollie according to the invention.

FIG. 2 is a side elevational view of a right-handed dollie with handle in horizontal position.

FIG. 3 is a view in perspective showing the right-handed embodiment of the invention just prior to insertion under a palletized load.

FIG. 4 is a fragmented side elevational view with right-handed and left-handed dollies according to the invention in place for carrying a palletized load.

DETAILED DESCRIPTION OF THE DRAWINGS

The preferred embodiment of the dollie of the invention has an angle iron frame and as shown in FIG. 1 comprises a handle 13 about 4 feet long which is fastened at one end, preferably by welding, to one end of a support member 15 also about 4 feet long, to form a 90° corner at 18. A steel reinforcing bracket 17 which engages surfaces 14 and 16 of the handle and support arm respectively is preferably welded to the handle 13 and support arm 15, securing them in perpendicular relationship. At the other end of handle 13, at 28 is bolted a retaining arm 27 for pivotal movement about location 28 as illustrated by the arrows in FIG. 1 from a position in which retaining arm 27 is aligned with handle 13 to a position in which the retaining arm is perpendicular to handle 13. In the preferred embodiment of the invention handle 13, support arm 15 and the retaining arm 27 are fabricated from $1\frac{1}{2}"\times 1\frac{1}{2}"\times \frac{1}{4}"$ angle iron. The retaining arm 27 is about 6 inches long. Four roller braces 19 are preferably welded to the support arm 15 so as to extend therefrom in a direction perpendicular to the length of arm 15 and to the length of handle 13. Steel rollers 23, about $1\frac{1}{8}$ inches in diameter and $14\frac{1}{2}$ inches long, and containing bearings (not shown) are rotatably mounted over axles 21 which are fixedly secured in ends of roller braces 19. Axles 21 are aligned with one another and parallel to the length of support arm 15. The roller braces 19 are fabricated from $\frac{3}{4}"\times\frac{3}{4}"$ angle iron. At the end of handle 13 in the vicinity of retaining arm mounting point 28, is a steel caster 24 which is rotatably mounted over a shaft 20 which is affixed by suitable means through a portion 25 of handle 13. Caster 24 which in the preferred embodiment has a diameter of about 1 inch, extends below handle 13 as illustrated in FIG. 2.

The proper use of the invention entails the use of two dollie assemblies, a left-handed one and a right-handed one, the right-handed dollie having the embodiment as described above and the left-handed dollie of the invention being the exact mirror image thereof.

In the operation of the apparatus according to the invention, a palletized load of material 29, including a pallet of standard design 31, is to be maneuvered manually in directions perpendicular to the direction in which forklift prongs enter pallet 31. The support arm 15 of a right-handed dollie is inserted within the pallet 31 under a right end portion of the load 29 as indicated by the arrow in FIG. 3. During insertion of the dollie under the pallet 31, handle 13 must be held in a generally vertical position as shown in FIG. 3, and any palletized load may be accommodated wherein the dimension x as shown in FIG. 3 is greater than the diameter of rollers 23. Once the arm 15 is fully extended under the load 29, the right-hand portion of load 29 is raised off the generally flat surface 35 on which it rests by moving handle 13 in a counterclockwise direction from its upright position to a horizontal position. When handle 13 is in this horizontal position as illustrated in FIG. 2 and FIG. 4, the vertical distance between the top surface 16 of support arm 15 and the bottom, floor, contacting surface of roller 23 must be greater than the distance X shown in FIG. 3 so as to ensure that a levering action will take place. Handle 13 is retained in its horizontal position when the retaining arm 27 is rotated to an open position, normal to handle 13, so as to engage the undersurface of pallet 31 and counter the tendency of handle 13 to spring back to an upright position.

FIG. 4 shows the configuration of the right-handed dollie in its engaged position under pallet 31. In a similar manner, a left-handed dollie is applied under the left end portion of the palletized load 29 and the handle 13 rotated in a clockwise direction, in a levering action, from its upright position to a horizontal position. The corresponding retaining arm 27 in the left-handed dollie is rotated to an open position and engages an undersurface of handle 13 of the right-handed dollie and thusly the whole palletized load 29 is carried on rollers by the dollies of the invention so that the load 29 may be manually maneuvered to the left and right as viewed in FIG. 4. The casters 24 ensure that rolling relationship is maintained with the floor even if the retaining end of handle 13 is moved into an engagement with the floor.

While a certain preferred embodiment of the invention is shown and described by way of illustration, many modifications will occur to those skilled in the art, and it is therefore to be understood that it is the intention for the appended claims to cover all such modifications as fall within in the true spirit and scope of the invention.

What is claimed is:

1. Apparatus for supporting a load of material so that it can be readily raised and moved over a generally flat surface, said material being arranged on a pallet, said pallet being supported by a plurality of legs to provide an undersurface spaced a distance from said flat surface, said apparatus comprising an L-shaped right-handed and left-handed dollie, each dollie, comprising:

a lever extending in a longitudinal direction,
   support means affixed to one end portion of said lever, said support means extending in a longitudinal direction which is perpendicular to the longitudinal direction of said lever, said lever and said support means lying generally between two parallel planes,
   rolling means attached to said support means, said rolling means extending from one longitudinal side of said support means in a direction which is perpendicular to said parallel planes and being mounted to rotate around a fixed axis which is parallel to the longitudinal direction of said support means, the vertical displacement of said rolling means and support means being less than said distance when said lever is in a generally vertical position and when said lever is rotated to a generally horizontal position and said rolling means and support means are disposed under said pallet, the vertical displacement of said rolling means and support means being greater than said distance so that said support means engages said pallet undersurface and said rolling means engages said flat surface whereby the legs of said pallet are lifted off said flat surface and said load is supported and may be transported over said flat surface, and means for retaining said lever in a horizontal position.

2. The apparatus of claim 1, wherein said right-handed dollie is insertable under a right-hand position of said pallet, the retaining means of said right-handed apparatus engaging said undersurface when the lever of said right-handed apparatus is generally horizontal and said right-handed retaining means is generally perpendicular.

3. The apparatus of claim 2, wherein said left-handed dollie is insertable under a left-handed portion of said pallet, the retaining means of said left-handed apparatus engaging an undersurface of the support means of said right-handed apparatus when the lever of said left-handed apparatus is generally horizontal and said left-handed retaining means is generally perpendicular.

4. The apparatus of claims 2 or 3, wherein said retaining means is an arm mounted at one end of said lever and said support means is an arm affixed at the other end of said lever.

5. The apparatus of claim 4, wherein said lever, support arm and retaining arm are fabricated from angle iron.

6. The apparatus of claim 5, wherein a steel reinforcing bracket is affixed to surfaces of said lever and support arm securing them in a substantially imutually perpendicular relationship.

7. The apparatus of claims 2 or 3, wherein said rolling means comprises a plurality of rollers.

8. The apparatus of claim 7, wherein said rolling means further comprises axles supported by braces extending from said support arm in a direction substantially perpendicular to a plane defined by said lever and said support arm, said axles rotatably carrying said rollers.

9. The apparatus of claim 7, wherein a caster is provided proximate the retaining means of each dollie, the axis of rotation of said caster being parallel to said parallel planes.

10. A method of raising, supporting and transporting a palletized load of material over a generally flat surface using a manually controllable apparatus having an elongated handle, an elongated support arm affixed substantially perpendicularly to an end of said handle, rollers for rolling said apparatus in a predetermined direction, axles for rotatably mounting said rollers, roller braces attached to said support arm for supporting said axles along an axis which is parallel to said support arm, said braces extending from said support arm in a direction substantially perpendicular to a plane defined by said handle and said support arm and a retaining arm pivotally mounted on the other end of said handle such that said retaining arm may pivot from a position which is aligned with said handle to a position which is perpendicular to said handle, said method comprising:

a. fully inserting the support arm of a right-handed apparatus within a pallet under a right end portion of said pallet while holding the handle of said right-handed apparatus in a generally upright position,
b. moving said right-handed handle in a counter-clockwise direction from its upright position to a generally horizontal position such that said right-handed support arm engages the undersurface of the pallet and the right-handed rollers engage said flat surface whereby the right end portion of said palletized load is raised off said surface,
c. rotating the right-handed retaining arm to a position which is perpendicular to said right-handed handle,
d. inserting said right-handed retaining arm within said pallet so that it engages the undersurface of said pallet and counters the tendency of said right-handed handle to spring back to an upright position,
e. fully inserting the support arm of a left-handed apparatus within said pallet under a left end portion of said pallet while holding the handle of said left-handed apparatus in a generally upright position,
f. moving said left-handed handle in a clockwise direction from its upright position to a generally horizontal position such that the support arm of said left-handed apparatus engages the undersurface of the pallet and the rollers of said left-handed apparatus engages said flat surface whereby the left end portion of the palletized load is raised off said surface,
g. rotating the retaining arm of said left-handed apparatus to a position which is perpendicular to said left-handed handle, and
h. engaging said left-handed retaining arm with an undersurface of said right-handed handle to prevent counter movement of said left-handed handle.

* * * * *